United States Patent
Mikiya et al.

(10) Patent No.: US 6,871,837 B2
(45) Date of Patent: Mar. 29, 2005

(54) VALVE STRUCTURE FOR USE IN A PIPE COUPLING AND A PIPE COUPLING COMPRISING THE VALVE STRUCTURE

(75) Inventors: Toshio Mikiya, Tokyo (JP); Koji Matsumoto, Tokyo (JP)

(73) Assignee: Nitto Kohki Co., Ltd., Tokyo (JP)

( * ) Notice: Subject to any disclaimer, the term of this patent is extended or adjusted under 35 U.S.C. 154(b) by 0 days.

(21) Appl. No.: 10/831,636

(22) Filed: Apr. 23, 2004

(65) Prior Publication Data

US 2004/0211474 A1 Oct. 28, 2004

(30) Foreign Application Priority Data

Apr. 24, 2003 (JP) ........................................ 2003-120137

(51) Int. Cl.[7] ................................................ F16L 37/28
(52) U.S. Cl. .................... 251/149.1; 251/900; 137/614; 137/614.04
(58) Field of Search ............................. 251/900, 149.1, 251/149.6; 137/614, 614.03, 614.04, 614.05

(56) References Cited

U.S. PATENT DOCUMENTS

| 2,666,614 | A | * | 1/1954 | Grove et al. ................ 251/900 |
| 4,096,884 | A | * | 6/1978 | Horowitz .................... 251/900 |
| 4,738,282 | A | * | 4/1988 | Boehringer ................. 251/900 |
| 6,176,263 | B1 | * | 1/2001 | Lacroix et al. ............. 137/614 |

FOREIGN PATENT DOCUMENTS

JP      S58-187687      12/1983

* cited by examiner

Primary Examiner—Kevin Lee
(74) Attorney, Agent, or Firm—Brinks Hofer Gilson & Lione

(57) ABSTRACT

A female or male coupler of a pipe coupling comprises a valve which is located in a fluid passage and is axially movable therein. The valve has a valve head which is provided with a sealing ring to be engaged with and disengaged from a valve seat formed on a wall surface defining the fluid passage of the coupler. The sealing ring is installed in an annular groove formed in the valve head. The bottom, or vicinity thereof, of the annular groove, which is isolated from the outside or the fluid passage by the sealing ring, is fluidly communicated with the exterior surface of the valve via a communication passage formed in the valve. As a result, even if a sudden large decrease in pressure is generated in the fluid passage, a pressure in the bottom, or the vicinity thereof, of the annular groove equalizes with the pressure in the fluid passage.

2 Claims, 4 Drawing Sheets

VALVE STRUCTURE FOR USE IN A PIPE COUPLING AND A PIPE COUPLING COMPRISING THE VALVE STRUCTURE

This application claims priority under 35 U.S.C. § 119 to Japanese Patent Application No. 2003-120137 filed Apr. 24, 2003, the entire content of which is hereby incorporated by reference.

BACKGROUND OF THE INVENTION

The present invention relates to a pipe coupling, and in particular to a valve provided in a pipe coupling.

In a conventional pipe coupling comprising male and female couplers for interconnection with one another, generally the male coupler and/or the female coupler is provided with a valve for closing and opening a fluid passage existing within the pipe coupling. The valve generally has a valve head provided with a sealing ring adapted to be engaged with and disengaged from a valve seat upon axial movement of the valve within the fluid passage. (Shown in JP Utility Model Publication No. S58-187687)

FIG. 5 shows part of a valve head 54 of a conventional-type valve 50 provided in a coupler fluid passage 52 formed, in this example, in a male coupler 51. The valve 50 comprises a valve head 54 having a tapered annular surface corresponding to a valve seat 53 formed in an interior surface of the coupler 51 defining the fluid passage 52. The tapered annular surface of the valve head is formed to have an annular groove 55 in which a sealing ring 56 made of rubber is disposed. The valve 50 is axially movably mounted in the fluid passage 52 and urged forward by a spring (not shown) so that the sealing ring 56 is sealingly engaged with the valve seat and, upon imposition of a rearward force on the valve 50, the valve is moved rearward and disengaged from the valve seat 53. As shown in the figure, a right side wall 57 of the annular groove 55 is inclined so as to hold the sealing ring between the right side wall 57 and a left side wall of the same, to thereby prevent the sealing ring from moving out from the annular groove 55.

When the valve 50 is operated to close the fluid passage 52, and the closed fluid passage is filled with a high pressure fluid, there is a possibility that the high pressure fluid will permeate into the interface between the sealing ring 56 and the side wall of the annular groove, and down to the bottom 59 of the annular groove 55. In such a case, if the fluid passage, into which a high pressure fluid has been filled, is subject to a sudden decrease in pressure resulting from, for example, discharge of the high pressure fluid, a large pressure difference will be generated between the outside or the fluid passage and bottom side of the annular groove. If this occurs, the sealing ring is liable to be dislodged from the annular groove 55 under the action of the high pressure fluid which has permeated down to the bottom of the annular groove.

SUMMARY OF THE INVENTION

Accordingly, it is an object of the present invention to provide in a coupler of a pipe coupling a valve in which a sealing ring is prevented from being forced out from an annular groove or a sealing ring holding groove formed in a valve, under the action of a high pressure fluid which has accumulated in the bottom of the sealing ring holding groove, even in a case that the valve is subject to a sudden large pressure decrease generated in a fluid passage in which the valve is provided.

According to one aspect of the present invention, there is provided a valve provided in a fluid passage of a male or female coupler for a pipe coupling such that the valve is movable in an axial direction of the fluid passage, the valve comprising:

an exterior surface including an annular surface corresponding to an annular valve seat formed in an interior surface of the coupler defining the fluid passage;

an annular groove formed in the annular surface;

an annular sealing ring disposed in the annular groove; and, a communication passage extending from a bottom portion of the annular groove, or a vicinity thereof, through the exterior surface;

the valve being axially movable in the fluid passage between a closing position wherein the annular sealing ring is engaged with the annular valve seat to close the fluid passage and an opening position wherein the annular sealing ring is disengaged from the annular valve seat to open the fluid passage.

The communication passage may extend from a bottom portion of the annular groove, or a vicinity thereof, through the exterior surface positioned rearward of or forward of the annular groove.

Further, the communication passage may extend from the bottom portion of the annular groove, or the vicinity thereof, along a side wall surface of the annular groove to form a groove extending along the wall surface, and between the bottom portion of the annular groove, or the vicinity thereof, and the annular surface.

According to another aspect of the present invention, there is provided a male or female coupler of a pipe coupling, the coupler having the characteristic features as stated above.

BRIEF DESCRIPTION OF THE DRAWINGS

These and other features, aspects, and advantages of the present invention will be apparent with reference to the following description, claims and accompanying drawings, where.

DETAILED DESCRIPTION OF THE INVENTION

Figure 1:
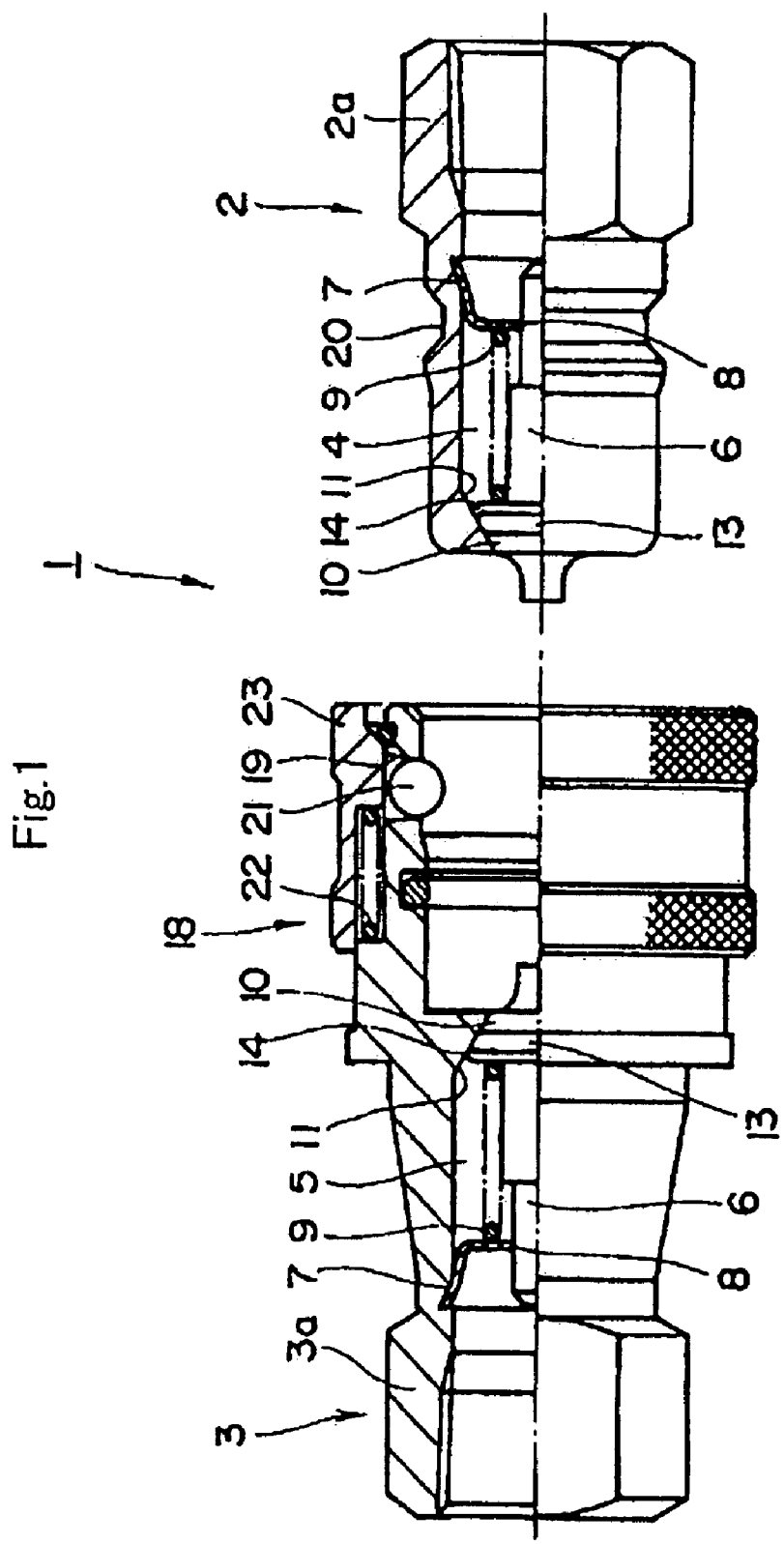
FIG. 1 shows an axial section of a pipe coupling provided with a valve in accordance with the present invention.

FIG. 1 illustrates a pipe coupling 1 to which the present invention is applied. As shown, the pipe coupling 1 comprises a male coupler 2 and a female coupler 3 which have fluid passages 4 and 5, respectively, in which valves 6, 6 are provided.

The valve 6 of the male coupler 2 is supported for axial movement in the fluid passage 4 by means of a valve support 7 secured on the interior surface of the male coupler 2 or the wall of the fluid passage 4 and urged forward by a coil spring 9 positioned between a valve head 10 and the valve support 7 so that the valve head 10 is movable between a closing position as shown in FIG. 1 in which the valve head 10 is urged against a tapered annular valve seat 11 formed in the interior surface of the male coupler 2 to close the fluid passage 4 and an opening position wherein the valve head 10 is disengaged from the valve seat 11 to open the fluid passage 4.

Figure 2:
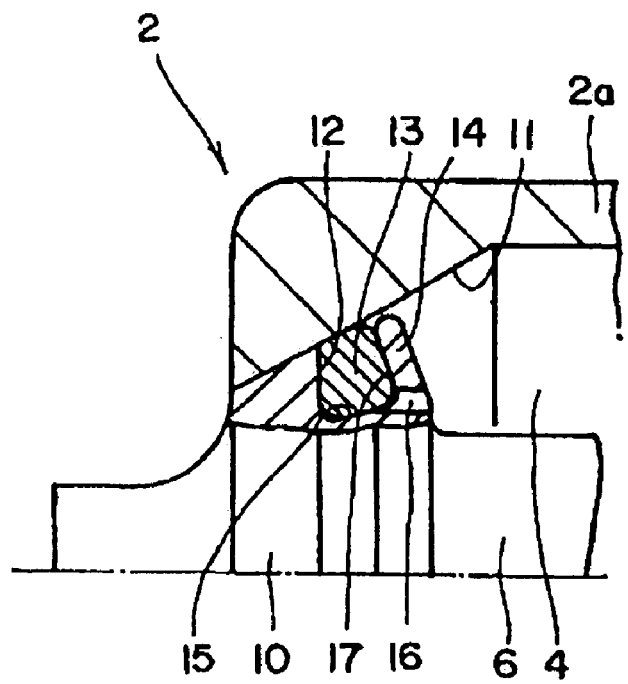
FIG. 2 shows an axial section of a part of the valve of FIG. 1 which is provided in a male coupler of the pipe coupling according to the first embodiment.

FIG. 2 shows a part of a forward end portion 2a of the male coupler 2. As shown, the valve head 10 has a tapered annular surface corresponding to the tapered annular valve seat 11 and is provided with a sealing ring 13 in an annular groove 12 formed in the tapered annular surface. The sealing ring 13 made of rubber is clamped between an inclined right side wall 14 of the annular groove 12 and a left side wall of the same to be retained in the annular groove 12.

In the right side wall 14 of the annular groove 12, there is provided a communication passage 16 extending from the bottom 15 of the annular groove 12 through an exterior surface of the valve head, and in this embodiment, through a rear side surface of the valve head so that the bottom 15 of the annular groove 12 is fluidly communicated with the fluid passage 4.

The valve 6 provided in the female coupler 3 is also axially movably supported in the fluid passage 5 by means of a valve support 7 secured to the wall surface of the fluid passage 5. The configuration of the valve 10 is the same as that of the valve of the male coupler 2 described above and, therefore, detailed explanation thereof will be omitted.

In FIG. 1, reference numeral 18 denotes a locking mechanism for locking/unlocking the male coupler 2 with respect to the female coupler 3. The locking mechanism comprises: a tubular coupler body 3a having a plurality of radial holes 19 which are formed in a forward end portion thereof, and which are spaced apart from each other in a circumferential direction; locking balls 21 disposed in the radial holes 19; and a sleeve 23 which is urged forward by a coil spring 22, and which is movable between an unlocking position, in which the sleeve 23 is moved rearward against coil spring 22 to allow the locking balls 21 to move radially outwardly to permit the male coupler 2 to be inserted into the female coupler 3, and a locking position in which the sleeve is moved forward by the coil spring 22 to force the locking balls 21 radially inwardly to engage them in the annular locking ball receiving groove 20, formed in the exterior surface of the male coupler 2, when the male coupler 2 is completely inserted into the female coupler.

In the embodiment described above, since the communication passage 16 fluidly communicates with the bottom 15 of the annular groove 12 formed around the valve 6 with the fluid passage 4, 5 of the coupler 2, 3, even if a sudden large pressure decrease occurs in the fluid passage, no substantial pressure difference will occur between the outside or the fluid passage and the bottom side of the annular groove 12, thereby avoiding the problem of the conventional art wherein the sealing ring is dislodged from the annular groove 12 of the valve.

Figure 3:
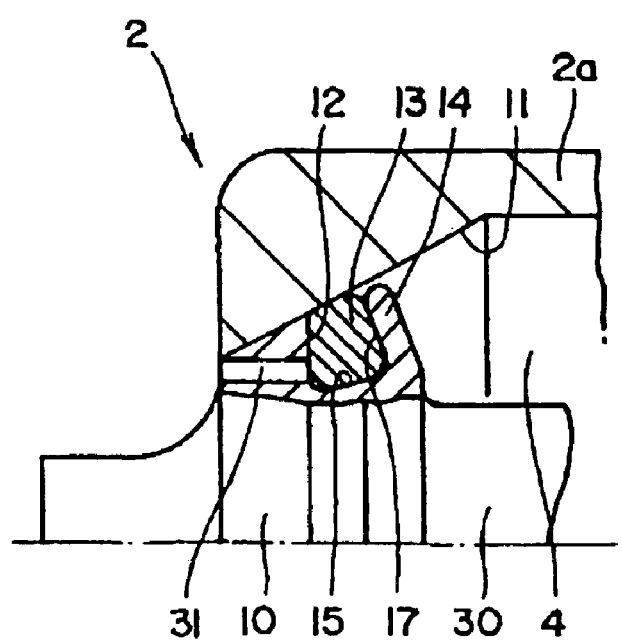
FIG. 3 shows an axial section of the part of the valve according to the second embodiment.

FIG. 3 illustrates a second embodiment of the present invention.

The male coupler 2 is substantially the same as that of the first embodiment described above except for the communication passage 31 extending from the bottom 15 of the annular groove 12 through a front surface of the valve head.

In this embodiment, if the male coupler 2, wherein the fluid passage is closed and filled with a high pressure gas, is connected to a female coupler to thereby fluidly connect the fluid passages of the male and female couplers, a pressure acting around the valve 30 will suddenly decreases. However, since the bottom 15 of the annular groove 12 is communicated with the fluid passages through the communication passage 31, no substantial pressure difference will occur between the outside or the fluid passage and the bottom side of the annular groove 12. As has been stated in connection with the conventional art described above, it is the case that when a high pressure fluid is discharged from the fluid passage of the male coupler to enable the male coupler to be easily connected to the female coupler, the sealing ring is caused to be dislodged due to a sudden large change in pressure around the valve. In contrast, in the coupler in accordance with the second embodiment, dislodgement of the sealing ring due to sudden change in pressure around the valve can be avoided.

Figure 4:
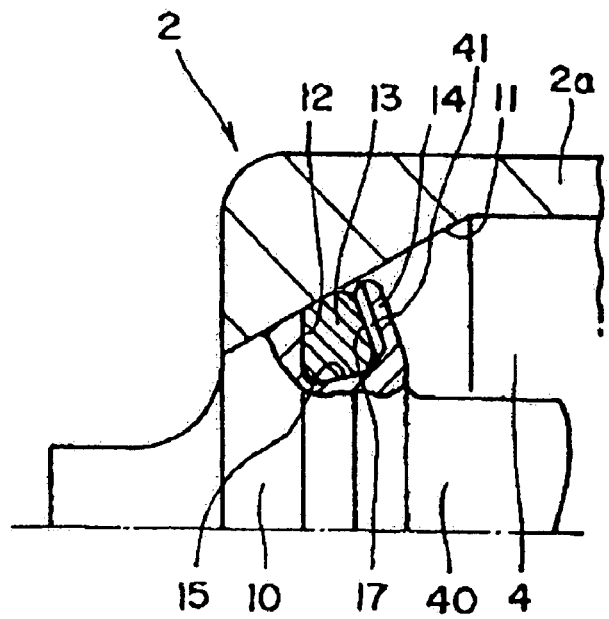
FIG. 4 shows an axial section of the part of the valve according to the third embodiment.
Figure 5:
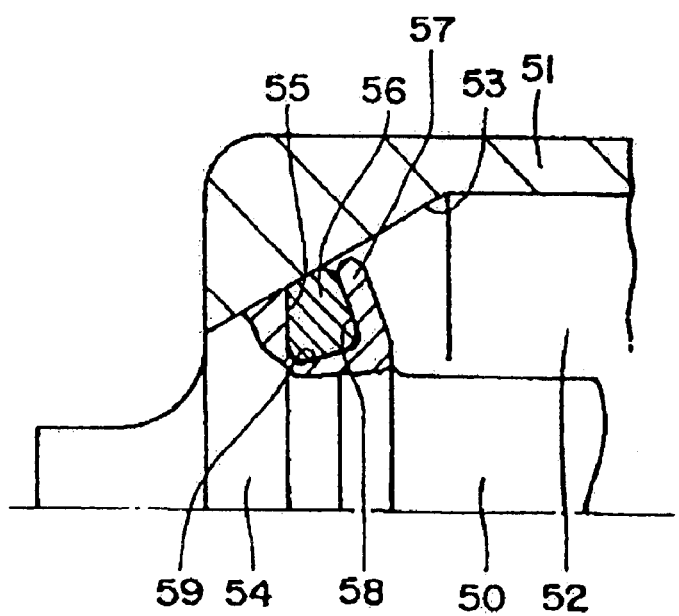
FIG. 5 shows an axial section of a part of a conventional valve.
Figure 6:
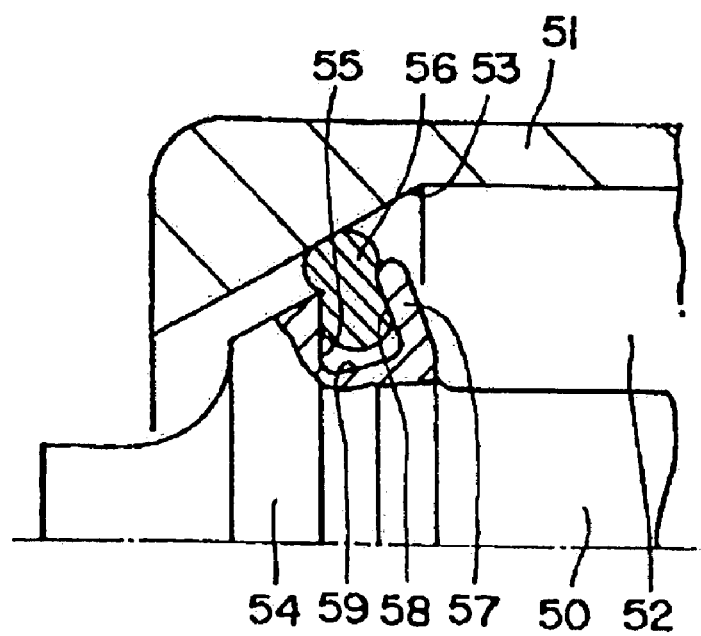
FIG. 6 shows the same valve of FIG. 5 wherein a sealing ring is shown in a position where it is dislodged from an annular groove.

FIG. 4 illustrates a third embodiment of the present invention.

In the embodiment, a communication passage 41 is formed as a groove extending along the right side wall surface 17 of the annular groove 12 from the bottom 15 of the annular groove 12 through the tapered annular surface of the valve head 10.

As in the first and second embodiments, due to the provision of the communication passage 41, no substantial difference in pressure will occur between the outside or the fluid passage and the bottom side of the annular groove, even if there is a sudden change in pressure generated around the valve.

It will be noted that the present invention has been described in an illustrative manner, and it is to be understood that the terminology that has been used is intended for the purpose of description only, and is not to be taken in any way as being limiting.

Obviously, many modifications and variations of the present invention are possible in light of the above teachings. It is, therefore, to be understood that within the scope of the appended claims, the invention may be practiced in a manner other than that specifically set out in the foregoing description.

What is claimed is:

1. A valve provided in a fluid passage of a coupler of a pipe coupling such that said valve is movable in an axial direction of said fluid passage, said valve comprising:

an exterior surface including an annular surface corresponding to an annular valve seat formed in an interior surface of said coupler defining said fluid passage;

an annular groove formed in said annular surface;

an annular sealing ring disposed in said annular groove; and, a communication passage extending from a bottom portion of said annular groove, or a vicinity thereof, through said exterior surface; wherein said valve is axially movable in said fluid passage between a closing position where said annular sealing ring is engaged with said annular valve seat to close said fluid passage, and an opening position where said annular sealing ring is disengaged from said annular valve seat to open said fluid passage, and said communication passage extends from said bottom portion of said annular groove, or said vicinity thereof, along a side wall surface of said annular groove to form an elongated side groove extending along said wall surface and between said bottom portion of said annular groove, or said vicinity thereof, and said annular surface.

2. A coupler of a pipe coupling comprising:

a coupler body having a fluid passage, an interior surface defining said fluid passage; and an annular valve seat formed in said interior surface; and, a valve installed in said fluid passage of said coupler body, said valve having an exterior surface including an annular surface corresponding to an annular valve seat formed in an interior surface of said coupler defining said fluid passage, and an annular groove formed in said annular surface, said valve comprising an annular sealing ring disposed in said annular groove, and, a communication passage extending from a bottom portion of said annular groove, or a vicinity thereof, through said exterior surface; wherein said valve is axially movable in said fluid passage between a closing position where said sealing ring is engaged with said valve seat to close said fluid passage, and an opening position where said sealing ring is disengaged from said valve seat to open said fluid passage, and said communication passage extends from said bottom portion of said annular groove, or said vicinity thereof, along a side wall surface of said annular groove to form a groove extending along said wall surface, and between said bottom portion of said annular grove or said vicinity thereof, and said annular surface.

* * * * *